3,458,484
PREPARATION OF HOMOGENEOUS COPOLYMERS OF α,β-UNSATURATED CYCLIC ANHYDRIDE
Robert L. Zimmerman, Midland, and Dale M. Pickelman, Auburn, Mich., assignors to The Dow Chemical Company, Midland, Mich., a corporation of Delaware
No Drawing. Continuation-in-part of application Ser. No. 388,313, Aug. 7, 1964. This application Apr. 7, 1967, Ser. No. 629,068
Int. Cl. C08f *17/00*
U.S. Cl. 260—78.5    7 Claims

ABSTRACT OF THE DISCLOSURE

This invention relates to the preparation of homogeneous copolymers of α,β-unsaturated cyclic anhydrides, and is more particularly concerned with a batch process for preparing copolymers of cyclic anhydride and vinylidene monomers wherein a half ester of the cyclic anhydride is employed as the starting monomer and the product is deesterified as formed to produce the desired anhydride copolymer.

---

This application is a continuation-in-part of our copending application Ser. No. 388,313 filed Aug. 7, 1964, now abandoned.

BACKGROUND OF THE INVENTION

It is known to polymerize monomers such as styrene with unsaturated cyclic anhydrides such as maleic anhydride. However, such polymerizations are exothermic; and, at the temperature necessary to maintain the anhydride in solution, there is considerable difficulty encountered in monomer handling and in maintaining temperature control and product homogeneity.

Non-homogeneous products are unsuitable for making polyester, alkyd type coating materials because they cause premature gelation and because of the presence of unbound vinyl homopolymer which results from the well known tendency of materials such as styrene and maleic anhydride to polymerize in a 1:1 ratio, as shown by Hicks, U.S. Patent 2,949,438, col. I, lines 32–41. Thus, in systems wherein a molar excess of vinyl monomer is employed, the maleic anhydride, or similar monomer, will be totally consumed while vinyl monomer is still present. The excess vinyl monomer must then homopolymerize forming unbound vinyl homopolymers which are unsuitable for making alkyd type coating materials because of their lack of resistance to chemical solvents. The Hicks patent also points to the unsuitability of using the heretofore known non-equimolar copolymers in epoxide films.

Thus there is a clear teaching in the prior art that uniform copolymers of cyclic anhydrides, such as maleic anhydride, and vinyl monomers such as styrene, in other than 1:1 ratios are not readily obtainable, even though they are desirable.

SUMMARY OF THE INVENTION

These problems are overcome by the process of the present invention wherein a half ester of the cyclic anhydride is employed as the starting monomer; and, during and after polymerization, the polymer is deesterified to produce the desired anhydride copolymer.

The half ester monomers employed are fully miscible with the vinylidene monomers permitting simple handling at ambient temperatures and permit the ready obtention of more uniform copolymer compositions, particularly at molar ratios of vinylidene to α,β-unsaturated dicarboxylic anhydride monomer greater than 4 to 1.

Vinylidene monomers which may be employed in the process of this invention include vinyltoluene, vinyl xylenes, t-butyl styrene, ar-chlorostyrenes, α-methylstyrene, vinyl esters of $C_5$–$C_{18}$ fatty acids, $C_4$–$C_8$ acrylates and $C_3$ or higher methacrylates. The preferred monomers are the styrene compounds.

Half esters which may be employed in the process of this invention include the $C_1$–$C_4$ primary and secondary alkyl half esters of maleic, chloromaleic, itaconic and aconitic acids. The preferred esters are the $C_1$–$C_3$ esters, most desirably the methyl ester.

The reaction may be catalyzed by any free radical initiator which can be used at 150–220° C., although a catalyst is not required. Preferred catalysts include benzoyl peroxide, di-t-butyl peroxide, and t-butyl hydroperoxide. The temperatures employed are from 150° to 220° C., and most advantageously from 160–200° C. Atmospheric pressure is preferred, although higher or lower pressures can be employed if the reaction temperature remains in the operative range.

Any inert solvent boiling above 150° C., and preferably being a solvent for the polymer, may be employed, such as, for example, aromatic hydrocarbons, chlorinated hydrocarbons, ketones, ethers or esters. Specific solvents which may be employed include mixed alkyl benzenes, cumene, acetophenone, and ethylene glycol monoethyl ether acetate solvents.

The monomers are advantageously fed to the heated solvent in from 0.5 to 5 hours. A linear feed rate is preferred and continuous feed is most desirable. The total feed time must be adjusted to the polymerization rate which depends on the temperature, catalyst, and amount of catalyst. It is preferred that a steady state of polymerization and monomer content in the reactor be quickly established and then maintained throughout the bulk of the process. The conversion of monomer to polymer should be at least 85 percent at the end of the feed time.

A steam condenser is preferably employed to reflux solvent and monomers but allow the low boiling alkyl alcohol to pass out of the system. The ratio of monomers to solvent is desirably in the range of 1:9 to 3:1 by weight and is preferably in the range of 2:3 to 3:2.

The result of the instant process is a low molecular weight anhydride copolymer containing less than 50 percent and preferably less than 10 percent of the anhydride groups esterified. The molecular weight is characterized by a 10 percent solution in MEK at 25° C. and will be in the range of 0.5 to 1.5, preferably 0.6 to 0.9 cps. Copolymers prepared by the method of this invention have a relatively uniform copolymer composition which can be characterized by precipitation fractionation. Preferably 90 percent of the polymer will lie within 5 percent anhydride content. The method of the invention applies most effectively to polymer compositions wherein the maleic or α,β-unsaturated dicarboxylic monomer is present to an extent of less than 20 mole percent. In this range essentially full deesterification can be obtained. An operative range of 5–33 mole percent anhydride content can be employed and maintain the advantages of composition homogeneity which the process affords. From 3–50 mole percent anhydride content is considered the maximum practical range for achieving reversal of the half ester to yield anhydride. In general, higher levels of half ester will not fully deesterify to anhydride.

DESCRIPTION OF THE PREFERRED EMBODIMENTS

Example 1

A 500 cc. reaction flask was charged with 200 g. of SC 150 mixed alkyl benzenes and heated in a nitrogen atmosphere to reflux at a pot temperature of 197° C. A mixture of 162 g. styrene, 38 g. methyl acid maleate (MAM), 1 g. di-t-butyl peroxide (DTBP) and 1 g. t-butyl hydroperoxide (TBHP) was fed from a dropping funnel in 8 cc. increments every 2.5 minutes over a total feed time of 70 minutes. The flask was fitted with a steam condenser to condense the SC 150 and styrene and permit passage of methanol which was condensed in a cold water condenser and trapped. A slow stream of nitrogen entered the reaction flask and passed through both condensers. During the 70 minute feed time, the pot temperature dropped to 186–188° C. A thermometer above the steam condenser registered 65–89° C., and 9.2 cc. of liquid collected in the distillation trap. After the feed had been added, reaction was continued 20 minutes with the pot temperature climbing to 192° C., the head temperature dropping to 61° C., and a total of 10.7 cc. or about 8.5 g. of primarily methanol being collected in the trap.

The flask was then rigged for simple distillation and 212 g. of distillate was removed up to a pot temperature of 285° C. A yield of 177 g. of clear copolymer was obtained having a volatile content of 0.9 percent and a solution viscosity (10 percent in MEK at 25° C.) of 0.698 cps. Infrared analysis of the polymer showed essentially no ester groups remaining (i.e. <5 percent). Titration of the copolymer with alcoholic KOH in pyridine using thymol blue indicator showed 15.0 percent (MA) by weight.

The resin was fractionated by dissolving 40 g. in 250 g. toluene and fractionally precipitating with Skellysolve, boiling range 96–99° C.

| Fraction | Skellysolve, cc. | Fraction weight, g. | Weight percent MA | Visc., cps. |
|---|---|---|---|---|
| 1 | 135 | 9.63 | 17.6 | 0.798 |
| 2 | 170 | 8.14 | 16.1 | 0.767 |
| 3 | 220 | 6.45 | 15.4 | 0.732 |
| 4 | 320 | 5.39 | 14.2 | 0.678 |
| 5 | 570 | 3.55 | 13.4 | 0.642 |
| 6 | 1,070 | 1.84 | 12.5 | |
| 7 | Residue | 4.77 | 12.8 | 0.509 |
| | | 39.77 | | |

Thus, greater than 95 percent of the sample is in a differential range of less than 5 percent MA.

Example 2

A mixture of 175 g. S+25 g. MAM+1 g. DTBP+1 g. TBHP was added to 200 g. SC 150 in flask at 201° C. over one hour at 7.5 minutes in 7.5 cc. portions each 2.5 minutes. The pot temperature fell to 154° C. over the course of the addition. The reaction mixture was heated an additional 10 minutes and then distilled to a pot temperature up to 260° C. The product (225 grams) was clear, gave a clear solution in toluene and infrared analysis showed very low ester content. The copolymer analyzed 9.0 percent MA by weight, 0.809 cps., and contained 1.1 percent volatile material.

vent in a trap that contained water. A total of 5 g. of MeOH by weight difference was removed in this manner. The pot temperature was about 152° C.

Example 4

A mixture of 170 g. styrene+30 g. isopropyl acid maleate was added in 5 cc. increments every 5 minutes over 210 minutes to 200 g. acetophenone in reaction flask refluxing at 203° C. with a moderate flow of nitrogen through the flask, steam condenser and water condenser (as in Example 1). The reaction temperature dropped to 178–181° C., the head temperature varied from 35–81° C., and 5 cc. of distillate was collected. Heating was continued 4 hours, the pot temperature reaching 198° C. and a total of 8 cc. distillate being trapped. Recovered 385 g. of clear polymer syrup containing about 44 percent solids. The transparent resin analyzed 9.1 percent MA and had a viscosity of 1.11 cps. A sample of resin devolatilized at 213° C. for 6 hours showed by infrared analysis that about 5–10 percent of the maleic groups were esterified.

Example 5

A mixture of 128 g. styrene, 72 g. methyl acid maleate and 7 g. benzoyl peroxide was fed in 11 cc. increments every 5 minutes over 90 minutes to 100 g. of ethylene glycol monoethyl ether acetate refluxing at 155° C. The pot temperature increased during the addition to 160° C. The head temperature was 37–69° C. and 13.5 cc. collected in the trap. Heated an additional 3 hours with the pot reaching 166° C. and a total of 19.5 cc. distilled overhead. Product solution containing 61.2 percent solids was clear and the devolatilized polymer (213° C. for 1 hour) was clear. Infrared analysis indicated about 40 percent of the maleic groups remained esterified. The resin titrated 26.5 percent MA; viscosity characteristic 0.831 cps. Devolatolized at 213° C. for 6 hours and infrared spectrum showed 20–30 percent of maleic groups esterified.

Example 6

Example 2 was repeated using 200 g. isopropyl benzene in flask refluxing at 154° C. and fed 153 g. S+47 g. butyl acid maleate+1 g. DTBP+1 g. TBHP in 8 cc. portions each 2.5 minutes over 1 hour 5 minutes. The temperature fell to 149° C. The reaction mixture was heated an additional 10 minutes and 239 g. of product were distilled off to 245° C. pot temperature. Infrared showed about 50 percent half ester of maleic groups present.

Example 7

For comparative purposes, experiments wherein the monomeric composition of Example 1 of this application were tried in the processes of both Bayer, British Patent 783,677 and Barrett, Canadian Patent 522,908 were performed under the indicated conditions and with the indicated results:

| | Method of this application | Method of Canadian 522,908 | Method of British 783,677 |
|---|---|---|---|
| Monomers | 38 g. methyl acid maleate, 162 g. styrene. | 38 g. methyl acid maleate, 162 g. styrene, 0.30 g. β-nitrostyrene. | 38 g. methyl acid maleate, 162 g. styrene. |
| Solvent | 200 g. SC 150 | None | 133 g. dioxane. |
| Catalyst | 1 g. di-t.-butyl peroxide, 1 g. t-butyl peroxide. | 0.1 g. di-t.-butyl peroxide | 0.6 g. benzoyl peroxide. |
| Polymerization temp., ° C | 186–197 | 65–125 | 92–106. |
| Time (hr.) | 2 | 15 | 15. |
| Percent conversion | 94 | 65 | 92. |
| Viscosity at 25° C. 10% in MEK (cps.). | 0.698 | 2.54 | Not measurable because of insoluble gels. |
| Clarity of product | Clear | Hazy | Opaque. |
| Polymer solubility in MEK | Soluble, clear | Soluble, clear | Insoluble gels. |
| Polymer solubility in toluene | Soluble, clear | 19.1 g. insoluble, 19.6 g. soluble. | 14 g. insoluble, 24 g. cloudy soluble. |

Example 3

An experiment similar to Example 1 was carried out using isopropyl benzene refluxing at 157° C. The feed was in 8 cc. increments at 2.5 minute intervals over 65 minutes. Methanol was extracted from the refluxing sol- It is thus seen that the processes of both Bayer and Barrett result in non-homogeneous products, as shown by the lack of clarity and high insolubility in toluene. Such products are not suitable for making polyester, alkyd type coating materials because they cause premature gelation and because of the presence of unbound vinyl homopolymer.

Example 8

Forty grams of each of the polymeric products prepared in Example 7 were individually fractionated by precipitation with 96–99° C. Skellysolve as follows:

| | Product by method of this application, 40 grams fractionated from 250 grams toluene | | | Product by method of Canadian 522,908, 40 grams fractionated from 250 grams methyl isobutyl ketone | | | Product by method of British 783,677, 40 grams fractionated from 250 grams methyl isobutyl ketone | | |
|---|---|---|---|---|---|---|---|---|---|
| Fraction | Cc. Skellysolve | Wt. fraction | Wt. percent MA | Cc. Skellysolve | Wt. fraction | Wt. percent MA | Cc. Skellysolve | Wt. fraction | Wt. percent MA |
| 1 | 135 | 9.63 | 17.6 | 135 | 6.20 | 28.50 | None | 19.24 | 23.0 |
| 2 | 170 | 8.14 | 16.1 | 305 | 19.71 | 21.15 | 170 | 5.41 | 13.0 |
| 3 | 220 | 6.45 | 15.4 | 600 | 9.48 | 13.10 | 600 | 11.30 | 8.50 |
| 4 | 320 | 5.39 | 14.2 | 600 | 1.50 | 9.55 | 600 | Very little | |
| 5 | 570 | 3.55 | 13.4 | Residue | 3.38 | 28.50 | Residue | 3.32 | 7.00 |
| 6 | 1070 | 1.84 | 12.5 | | | | | | |
| 7 | Residue | 4.77 | 12.8 | | | | | | |
| | | 39.77 | | | 40.27 | | | 39.27 | |

The homogeneity of the products of this invention is seen in the fact that the maleic anhydride contents of the various fractions are within a range of 5 percent, in contrast to the range of about 19 percent for the products of Canadian 522,908 and 16 percent for the products of British 783,677, differences of 3 to 4 fold in homogeneity. The non-homogeneity of the prior art products shows up as lack of clarity to the naked eye, and is undesirable in both clear and high gloss pigmented coatings applications. In addition, poor shelf stability, poor solvent resistance, poor stain resistance, etc., result when non-homogeneous products are employed in coatings.

Example 9

Further experiments were carried out using the process and composition of Example I of this application, except at polymerization temperatures of 180° C., 160° C., 140° C., and 120° C. as follows.

Feed composition: Grams
- Methyl acid maleate (9.35 gr. or 11.8 ml. methanol) — 38.0
- Styrene — 162.0
- Di-t-butyl peroxide — 1.0
- t-Butyl hydroperoxide — 1.0

Four separate batches of this feed solution were prepared, and each batch was individually added in 8 cc. increments every 5 minutes to a 3-necked flask containing 200 grams of SC 150 which was stirred and maintained at the indicated temperature. The flask was fitted with a steam condenser to condense the compounds boiling above 100° C., and thus permit the passage of methanol, which was condensed in a cold water condenser and trap.

| Sample | Polymerization temp., ° C. | Time (hrs.) | Ml.MeOH off |
|---|---|---|---|
| 1 | 180 | 2.25 | 10.5 |
| 2 | 160 | 2.25 | 7.0 |
| 3 | 140 | 2.67 | 4.2 |
| 4 | 120 | 2.67 | 1.6 |

It is thus seen that at 120° C. deesterification is negligible, while at 160° C. nearly ⅔ of the methanol is removed in 2¼ hours, while at 180° C. the deesterification is substantially complete.

The homogeneous copolymers of this application contain enough reactive anhydride sites and are still low enough in molecular weight for polyester, alkyd type coating materials. This process can be readily adapted to conventional cooking kettles to prepare homogeneous copolymers of low molecular weight which are necessary to avoid premature gelation and to reduce or eliminate unbound vinyl homopolymer, in alkyd type coatings.

Various modifications may be made in the present invention without departing from the spirit or scope thereof and it is understood that we limit ourselves only as defined in the appended claims.

We claim:

1. A batch process for making homogeneous copolymers of from 5 to 33 mole percent of $\alpha,\beta$-unsaturated cyclic anhydride and correspondingly, from 95 to 67 mole percent of vinylidene monomers wherein the anhydride composition of 90 percent of the polymer is within a 5 percent range by precipitation fractionation, which comprises feeding, over a period of from 0.5 to 5 hours, a mixture of a $C_1$ to $C_4$ alkyl half ester of said anhydride, and said vinylidene monomer into an inert solvent in the presence of a free radical generating catalyst at a temperature of 150–220° C. whereby the half ester is de-esterified and de-esterified alcohol is removed as it is formed to produce an anhydride copolymer wherein less than 10 percent of the anhydride groups are monoesterified.

2. Process of claim 1 wherein the temperature is from 160° to 200° C.

3. Process of claim 2 wherein the half ester is the methyl ester.

4. Process of claim 3 wherein the anhydride is maleic anhydride.

5. Process of claim 4 wherein the vinylidene monomer is styrene.

6. Process of claim 1 wherein the solvent comprises at least one alkyl benzene.

7. Process of claim 1 wherein the catalyst is a member of the group consisting of benzoyl peroxide, di-t-butyl peroxide and t-butyl hydroperoxide.

References Cited

UNITED STATES PATENTS 3,336,267　8/1967　Zimmerman ——————— 260—78.5

FOREIGN PATENTS 522,908　3/1956　Canada.
783,677　9/1967　Great Britain.

JOSEPH L. SCHOFER, Primary Examiner

C. A. HENDERSON, JR., Assistant Examiner